(12) United States Patent
Kano

(10) Patent No.: US 6,923,572 B2
(45) Date of Patent: Aug. 2, 2005

(54) DATA ACQUISITION DEVICE USING RADIO FREQUENCY IDENTIFICATION (RFID) SYSTEM

(75) Inventor: Shiro Kano, Tokyo (JP)

(73) Assignee: Yamatake Corporation, Tokyo (JP)

( * ) Notice: Subject to any disclaimer, the term of this patent is extended or adjusted under 35 U.S.C. 154(b) by 384 days.

(21) Appl. No.: 10/276,897

(22) PCT Filed: May 25, 2001

(86) PCT No.: PCT/JP01/04412

§ 371 (c)(1),
(2), (4) Date: Nov. 20, 2002

(87) PCT Pub. No.: WO01/90699

PCT Pub. Date: Nov. 29, 2001

(65) Prior Publication Data

US 2003/0153987 A1 Aug. 14, 2003

(30) Foreign Application Priority Data

May 25, 2000 (JP) .................... 2000-154850

(51) Int. Cl.[7] .................... G01K 7/16; G11C 7/00
(52) U.S. Cl. .................... 374/129; 374/183; 374/184; 374/185; 374/121; 374/133; 365/211; 365/191; 365/192; 365/195
(58) Field of Search .................... 374/143, 183, 374/184, 185, 129, 121, 120, 133; 365/191, 192, 195, 211, 212, 213

(56) References Cited

U.S. PATENT DOCUMENTS

| | | | | |
|---|---|---|---|---|
| 4,443,117 A | | 4/1984 | Muramoto et al. | 374/1 |
| 5,583,819 A | * | 12/1996 | Roesner et al. | 340/10.51 |
| 6,813,209 B2 | * | 11/2004 | Crain et al. | 365/208 |
| 2004/0100834 A1 | * | 5/2004 | Waters | 365/200 |
| 2004/0136255 A1 | * | 7/2004 | Crain et al. | 365/208 |

FOREIGN PATENT DOCUMENTS

| | | | | |
|---|---|---|---|---|
| JP | 57-205000 A | 12/1982 | | G08C/25/00 |
| JP | 59-225323 A | 12/1984 | | G01K/7/24 |
| JP | 6-241827 A | 9/1994 | | G01D/3/02 |
| JP | 11-125563 A | 5/1999 | | G01K/1/02 |
| JP | 2000-278045 A | 10/2000 | | H03B/5/32 |

* cited by examiner

Primary Examiner—Andrew Q. Tran
(74) Attorney, Agent, or Firm—Frishauf, Holtz, Goodman & Chick, P.C.

(57) ABSTRACT

A sensor 2 of a data collection system 2 is designed to make, in a predetermined environment, an operation of writing output data of a sensing circuit 24 into a non-volatile memory 22 as reference-value data, and, in a measurement environment, an operation of transmitting output data of the sensing circuit and reference-value data stored in the non-volatile memory, under the control of a memory control section 25, thereby selectively performing by itself the data-writing or data-transmitting operation without receiving instructions from a readout device.

16 Claims, 6 Drawing Sheets

FIG. 12  PRIOR ART

DATA ACQUISITION DEVICE USING RADIO FREQUENCY IDENTIFICATION (RFID) SYSTEM

This application is a U.S. National Phase Application under 35 USC 371 of International Application PCT/JP01/04412 filed May 25, 2001.

TECHNICAL FIELD

The present invention relates to a data collection system for collecting data for control use.

A data collection system for providing a controller with data typically comprises a sensor, including a sensing element and an electronic circuit (sensing circuit) for converting the output of the sensing element into electric signal, and a readout device for analyzing the output of the electronic circuit of the sensor. FIG. 12 exemplarily shows a data collection system of this kind having a sensor 2 that includes a temperature sensing element and a sensing circuit. For data collection or measurement, the readout device (parent device) 1 transmits a measurement command through a transmission space 3 to the sensor (child device) 2 placed in a measurement environment 4, and in response to this, the sensor 2 transmits the output of the sensing circuit indicating a measured temperature.

Generally, the output of the electronic circuit (detected value) cannot accurately indicate the actual value of a measured parameter since sensing elements entail characteristic variations caused by individual differences. By way of example, the sensing circuit of the sensor shown in FIG. 12 of a type fabricated by CMOS process entails a large variation (individual difference) in output value which may rise to several tens %. To reduce measurement errors caused by the individual difference of the sensing circuit, the output therefrom is subject to rectification. For example, in the data collection system shown in FIG. 12, the output of the sensing circuit of the sensor 2 placed in an environment of a fixed temperature for a fixed time is transmitted to the readout device 1 as a reference value, which is stored in a memory of the readout device. In temperature measurement, the readout device 1 utilizes the reference value to rectify the output (detected temperature value) of the sensing circuit received from the sensor 2. The rectified value is provided for temperature control.

In the sensor 2 for transmitting the reference value for initialization and the detected value for measurement as mentioned above, the sequence of circuit operation is different between when the initialization is made and when the measurement is made. Thus, the readout device 1 is required of giving instructions as to which of initialization and measurement the sensor 2 should perform. To this end, the readout device 1 transmits a signal modulated with instruction data, for instance. In order to improve the quality of radio transmission therefor, however, a complicated signal modulation system and/or a complicated signal data structure is required. In addition, the sensor 2 requires a large-scale electronic circuit including circuits for signal demodulation and for analysis of signal data structure, making it difficult to downsize the sensor.

DISCLOSURE OF THE INVENTION

The object of the present invention is to provide a data collection system having a sensor capable of selectively performing an initializing operation or a measuring operation based on a self-determination, without relying on instructions given by a readout device.

In order to attain the above object, the present invention provides a data collection system which comprises a readout device and a sensor. The data collection system of this invention comprises radiation means for radiating electromagnetic energy, and the readout device comprises collection means for collecting data from the sensor. The sensor comprises a sensing circuit including a sensing element, a coil for introducing the electromagnetic energy radiated from the radiation means, a power source section, connected with the coil, for generating internal electric power, a non-volatile memory, a memory control section for controlling data-writing into the non-volatile memory, and a transmitter section for transmitting an output of the sensing circuit and data stored in the non-volatile memory. The memory control section includes determination means for determining the number of times that the data-writing into the non-volatile memory has been made. On the basis of the result of determination effected by the determination means, the memory control section restricts the number of times of the data-writing into the non-volatile memory to a predetermined number of times and renders the transmitter section operative.

In the data collection system of the present invention, the sensor is arranged to generate internal electric power from external electromagnetic energy, and hence does not require a power source such as a battery. Further, the sensor can transmit the output of the sensing circuit and the data stored in the non-volatile memory, and determine the number of times that the data-writing into the non-volatile memory has been made. On the basis of the determination result, the sensor self-determines which of the data-writing into the non-volatile memory and the data transmission to the readout device should be made, and selectively performs the data-writing or the data transmission. In the measurement, therefore, by transmitting the reference value (output of the sensing circuit in a predetermined environment) stored beforehand in the non-volatile memory and the output of the sensing device, the output of the sensing device can be rectified by the readout device using the reference value, whereby an accurate measured value can be obtained.

According to the present invention, when the sensor makes an initializing operation of writing the reference value into the non-volatile memory or a measuring operation of transmitting the output of the sensing circuit and the reference value, the readout device is not required to transmit a command to start the initializing operation or the measuring operation. This eliminates the need of providing the sensor with a large-scale electronic circuit for analyzing a complicated signal modulated with the command superimposed thereon, whereby the data collection system can be simplified and downsized.

In the present invention, desirably, the non-volatile memory stores data peculiar to the sensor or data indicating the kind of the sensing circuit. With this desirable form, the readout device can identify individual sensors based on the data received therefrom when the pieces of data peculiar to the individual sensors are stored in the non-volatile memories of the sensors, respectively. Even if the pieces of data are transmitted from a number of sensors and collected by the data collection means of the readout device, the pieces of data from individual sensors can be easily and accurately distinguished from one another. In the case of the data indicative of the kind of the sensing circuit being stored in the non-volatile memory, only when the received output data or the received reference-value data falls within an allowable range preset for each kind of sensing circuit, the readout device is enabled to make measurement based on the output data and the reference-value data. This prevents inappropriate measurement based on inappropriate data, which is caused by a reduction in internal electric power, for instance.

Desirably, the radiation means is provided in the readout device, and the readout device does not superimpose information on the electromagnetic energy.

With this desirable form, information including a command causing the initializing or measuring operation to be selectively performed is not superimposed on the electromagnetic energy. For the reason mentioned above, the sensor can by itself selectively perform the initializing or measuring operation, without receiving such information. Consequently, the data collection system can have a simple structure. With this desirable form, the data collection system consisting of the readout device including the radiation means and the sensor has a further simplified structure.

In the present invention, desirably, the memory control section allows the output of the sensing circuit to be written into the non-volatile memory only when the output of the sensing circuit falls within a predetermined range. With this desirable form, the output of the sensing circuit of the sensor placed in a predetermined environment is written in the non-volatile memory only when it is appropriate for use as the reference value, whereby only the appropriate reference value can be stored in the non-volatile memory.

Desirably, the sensing element in the sensing circuit is comprised of a thermosensitive element or a pressure-sensitive element. With this desirable form, the data collection system can perform temperature or pressure measurement. Since a sensing element of this kind can be integrated into the sensing circuit on a single semiconductor, a small-size sensor can be provided.

BRIEF DESCRIPTION OF THE DRAWINGS

FIG. 12 is a schematic diagram showing a conventional data collection system.

BEST MODE OF CARRYING OUT THE INVENTION

A data collection system of a first embodiment of the present invention will be described, with reference to FIGS. 1 through 6.

Figure 1:
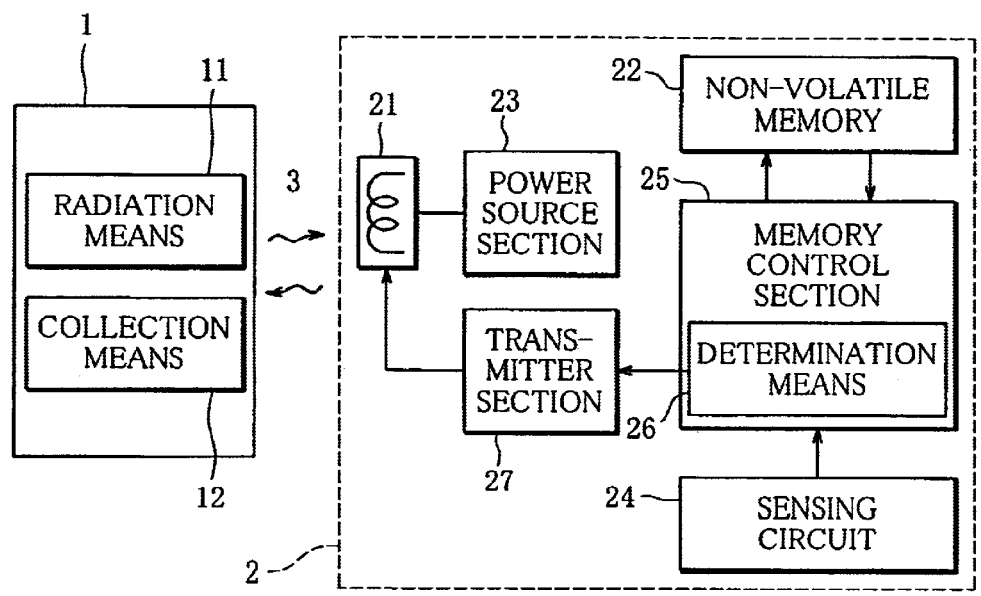
FIG. 1 is a schematic block diagram showing a data collection system according to a first embodiment of the present invention.

As shown in FIG. 1, the data collection system comprises a readout device 1 and a sensor 2. The readout device 1 comprises radiation means 11 for radiating electromagnetic energy and collection means 12 for collecting data transmitted from the sensor 2. The sensor 2 comprises a coil 21, a non-volatile memory 22, a power source section 23, a sensing circuit 24, a memory control section 25, and a transmitter section 27. The memory control section 25 includes determination means 26.

The sensor 2 is designed to receive, through an antenna, electromagnetic energy radiated from the radiation means 11 of the readout device 1 placed in a transmission space 3 together with the sensor 2. When the antenna is comprised of a coil 21 as shown in FIG. 1 or when the readout device 1 is required of a simple circuit-structure, radio wave ranging from medium frequency of several hundreds kHz to short wave of several tens MHz is suitable for use as the electromagnetic energy, although the electromagnetic energy is not restricted to such radio wave. The readout device 1 amplifies a high-frequency signal produced by an oscillator (not shown) in the radiation means 11, and radiates it as electromagnetic energy to the transmission space 3. It is unnecessary to superimpose information, such as a command to operate the sensor 2, on the electromagnetic energy. In this embodiment, the radiation means is provided in the readout device 1, but may be provided outside the readout device 1.

Figure 2A:
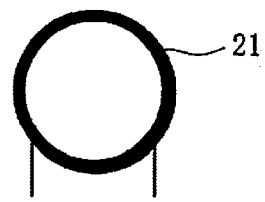
FIG. 2A is an illustration showing an example of a coil used in a sensor shown in FIG. 1.
Figure 2B:
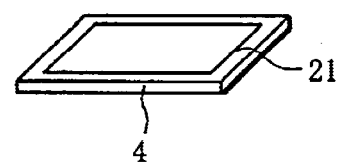
FIG. 2B is a schematic perspective view of another example of a coil.
Figure 2C:
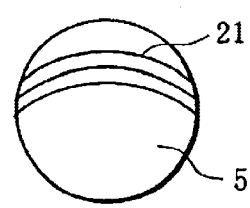
FIG. 2C is a schematic perspective view of still another example of a coil.

The electromagnetic energy is introduced into the sensor 2 through the coil 21. The coil 21 may be formed by a looped copper wire. Alternatively, it may be formed on a semiconductor chip to downsize the sensor 2. FIG. 2A shows a coil 21 formed by a looped copper wire, and FIG. 2B shows a coil 21 comprised of a conductor formed on the surface of a semiconductor chip 4 by photolithography. As for the sensor 2 comprised of a spherical semiconductor having a diameter of several mm, the coil 21 may be several tuns of a conductor formed on the surface of the spherical semiconductor 5 as shown in FIG. 2C.

Figure 3:
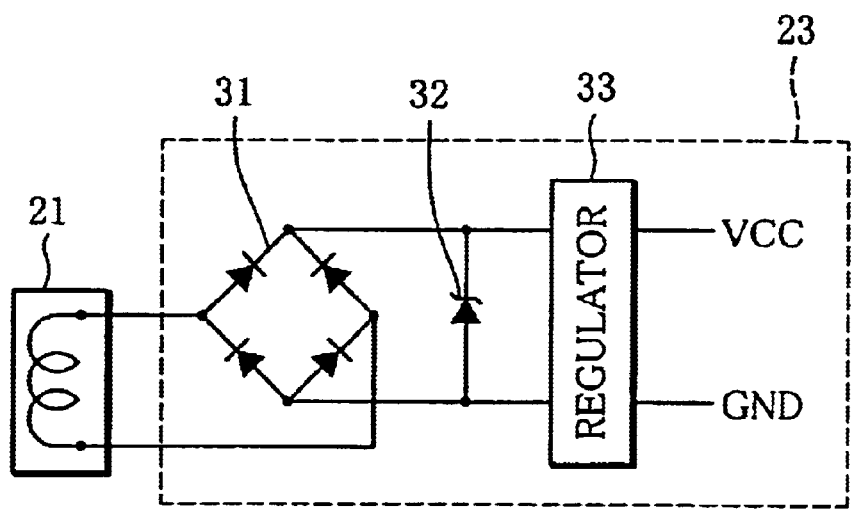
FIG. 3 is a diagram showing an example of structure of a power source section of the sensor shown in FIG. 1.

The electromagnetic energy introduced through the coil 21 is converted from alternating current to direct current in the power source section 23, whereby internal electric power is generated. FIG. 3 shows an example of structure of the power source section 23. The opposite ends of the coil 21 are connected with a full-wave rectifier circuit 31 where the electromagnetic energy is converted from alternating current to direct current. A limiter 32, which is constituted by a Zener diode in the illustrated example, prevents the generation of overvoltage of several tens volt or higher across the opposite ends of the coil 21 even when the transmission distance between the sensor 2 and the readout device 1 is short, whereby elements in the sensor 2 are prevented from being destroyed by the overvoltage. The electromagnetic energy converted from alternating current to direct current by the full-wave rectifier circuit 31 is supplied to a regulator 33 under the overvoltage protection by the limiter 32. The regulator 33 generates a predetermined voltage between VCC (power-source line) and GND (ground line) and supplies power to respective circuits in the sensor 2. In this example, the full-wave rectifier circuit is used for rectification, but a half-wave rectifier circuit may be used instead. Further, the limiter 32 is not restricted to a Zener diode as long as it can provide similar overvoltage protection. For example, the limiter 32 may be a shunt regulator.

The sensor 2 is enabled to operate when the internal electric power generated by the power source section 23 is supplied to circuits in the sensor 2. The sensing circuit 24 comprises, for example, a ring oscillator including a thermosensitive element, and starts oscillation when rendered operative.

Figure 4:
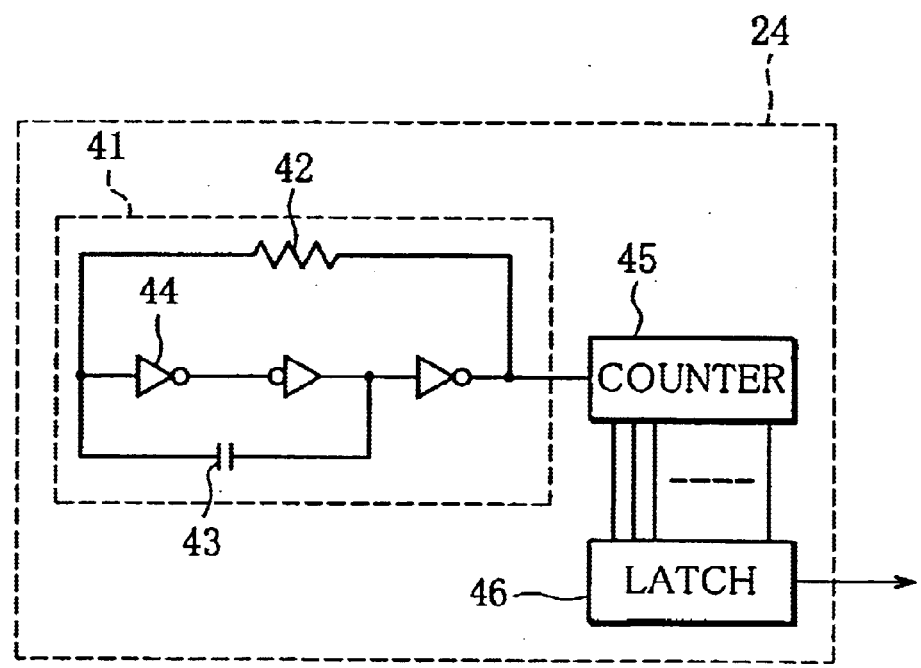
FIG. 4 is a diagram showing an example of structure of a sensing circuit of the sensor.
Figure 5:
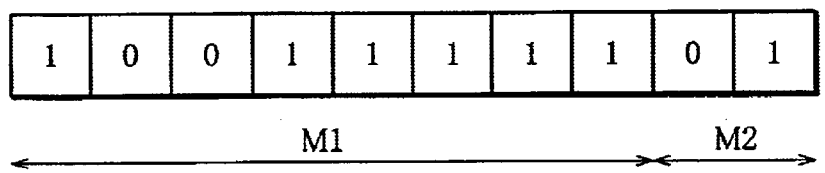
FIG. 5 is a diagram showing an example of data stored in a non-volatile memory shown in FIG. 1.

FIG. 4 shows an example of structure of the sensing circuit 24. The sensing circuit 24 comprises a ring oscillator 41 including a resistor 42, a capacitor 43 and inverters 44; a counter 45 for measuring the oscillation frequency of the ring oscillator 41; and a latch 46 for holding, at predetermined timings, a count value of the counter 45 representative of the oscillation frequency of the ring oscillator 41. The resistor 42 and the capacitor 43, which are thermosensitive elements, have values (resistance and capacitance) varying depending on variation in ambient temperature, thus varying the oscillation frequency of the ring oscillator 41. The output of the ring oscillator 41 is supplied to the counter 45 where the oscillation frequency of the ring oscillator 41 is measured. In short, the sensing circuit 24 includes the temperature sensing element and serves to make temperature measurement.

As for the measurement of the oscillation frequency of the ring oscillator 41, the electromagnetic energy or the output of the ring oscillator 41 is shaped into a clock signal by a waveform shaping circuit (not shown) while pulses are generated in the counter 45, and the number of pulses generated in one cycle of the clock signal is counted by the counter 45. No waveform shaping circuit is needed, if the sensor 2 is provided with another oscillator such as a crystal oscillator or another oscillation circuit such as a ring oscillator. The value counted by the counter 45 is held by the latch 45 at predetermined timings, to be sent to the memory control section 25.

The sensor having the sensing circuit 24 described above is characterized in that, in addition to the power source section 23 for introducing external electromagnetic energy through the coil 21 to generate internal electric power, it comprises a memory control section 25 for writing the output data of the sensing circuit into the non-volatile memory 22 only a predetermined number of times; and that the memory control section 25 includes determination means 26 for determining the number of times that data has been written into the non-volatile memory 22 and for rendering the transmitter section 27 operative. In this embodiment, the output data of the sensing circuit 24 written into the non-volatile memory 22 is the count value of the counter 45 or the output of the latch 46 representing the oscillation frequency (oscillation period) of the ring oscillator.

The sensor 2, designed to generate internal electric power from electromagnetic energy, cannot generate internal electric power when no readout device 1 is provided or the sensor 2 is placed at a location where it cannot receive electromagnetic energy from the readout device 1. In this regard, the memory of the sensor 2 is preferably comprised of a non-volatile memory that holds stored information without power supply.

As explained above, sensing circuits fabricated by CMOS process entail individual differences in characteristics, causing a variation in the output of a sensing circuit that often comes up to several tens %. To remove a measurement error due to the individual difference of the sensing circuit, rectification is carried out. In this embodiment, the output of the sensing circuit of the sensor 2, placed in a predetermined environment such as a constant temperature bath, is stored beforehand in the non-volatile memory as a reference value. Using the reference value, the output (measured value) of the sensing circuit of the sensor 2 placed in a measurement environment is rectified, thereby eliminating or reducing a measurement error caused by the individual difference of the sensor.

The reference value for rectification must be held in the non-volatile memory 22 of the sensor 2 in a non-rewritable manner, and therefore, a fuse-type memory is preferable for use as the memory 22 that allows the reference value to be written only once and prevents the reference value from being rewritten by mistake. However, a memory such as EEPROM may be used that allows multiple electrical rewriting.

As already mentioned, the memory control section 25 controls the writing of the reference value (the output of the sensing circuit placed in a predetermined environment) into the non-volatile memory 22 and controls the transmission of the output of the sensing circuit placed in a measurement environment.

Figure 6:
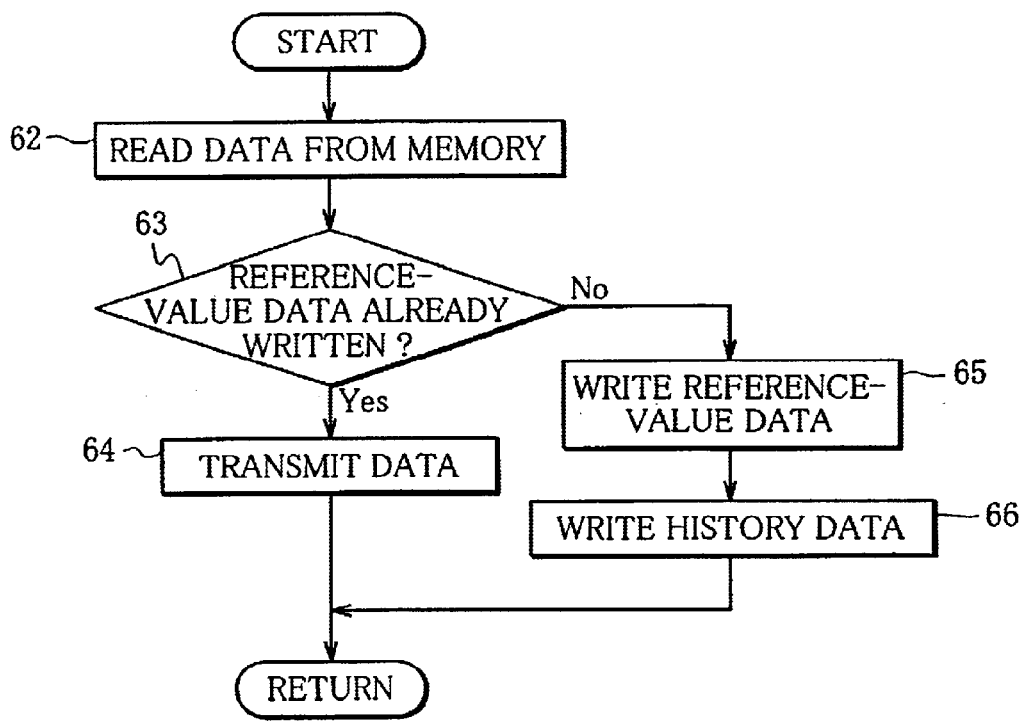
FIG. 6 is a flowchart showing a data-writing/transmission control routine executed by a memory control section of the sensor.

With reference to FIG. 6, an example of datawriting/transmission control operations (initializing and measuring operations) of the memory control section 25 will be described.

When internal electric power generated by the power source section 23 from electromagnetic energy is supplied to the memory control section 25 in the sensor 2, the memory control section 25 is rendered operative to start executing a datawriting/transmission control routine shown in FIG. 6.

First, the memory control section 25 accesses the non-volatile memory 22 and reads data stored therein (step 62). The data consists of binary data of 10 bits as exemplarily shown in FIG. 5. Eight higher-order bits (M1) thereof constitute reference-value data and two lower-order bits (M2) constitute writing-history data.

Next, the determination means 26 of the memory control section 25 determines whether the reference-value data M1 has been written into the non-volatile memory 22 based on the history data M2 (the content of the two lower-order bits of the data read in step 62) (step 63). It is determined that the reference-value data M1 has been written, if the history data M2 is not identical to the initial value (for example, "00") written in the history data area of the non-volatile memory 22 when the sensor 2 was manufactured or shipped, for instance.

When determining in step 63 that the reference-value data has not been written (which means that the sensor 2 is placed in a predetermined environment), the memory control section 25 writes the output of the sensing circuit 24 into the reference-value data area of the non-volatile memory 22 as reference-value data M1 (step 65), and writes the history data M2 such as "01", indicating that the reference-value data has been written, into the history data area of the non-volatile memory 22 (step 66), whereupon the execution of the writing control routine in the present cycle ends. Thus, in a cycle where the reference-value data is written, the determination means 26 does not allow the transmitter section 27 to operate, thereby maintaining the transmitter section 27 inoperative.

When determining in step 63 that the reference-value data has been written, the determination means 26 allows the transmitter section 27 to operate, and the memory control section 25 sends the output data of the sensing circuit 24 and the reference-value data written in the non-volatile memory 22 to the transmitter section 27. The transmitter section 27 encodes the output data and the reference-value data by Bi-phase encoding or Manchester encoding, for instance, and transmits the encoded data to the readout device 1 through the coil 21 (step 64).

As mentioned above, once the reference-value data has been written so that the history data has been changed from the initial value "00" at shipment to "01", the result of the determination in step 63 is always negative to permit the control flow to proceed from step 63 to step 64. In other words, once the reference-value data is written, rewriting the reference-value data is prohibited.

The data transmission in step 64 may be achieved by changing the impedance of the sensor 2 or by transmitting electric wave, for instance, but the way of data transmission is not restricted thereto as long as radio data transmission to the readout device 1 is achieved.

In the readout device 1, the output data of the sensing circuit and reference-value data successively transmitted from the sensor and collected by the collection means 12 are amplified, demodulated, and subject to rectification for establishing matching between the output data of the sensing circuit 24 and the reference-value data.

In a case where a parameter value, e.g., temperature of the measured object (for example, the preset temperature of a constant temperature bath) is known, which was observed at acquisition of the reference-value data, the reference-value data is converted in the readout device 1 into temperature data to determine a detected temperature value in a predetermined environment, and a difference between the detected temperature value and the known temperature value is determined as a correction value. To determine a detected temperature value in a measurement environment, the output data is converted into temperature data, and the detected temperature value is rectified by use of the correction value. The detected temperature value thus rectified accurately represents the temperature of the measured object in the measurement environment.

A data collection system according to a second embodiment of the present invention will be described below.

In this embodiment, to set the reference value for the output of the sensing circuit 24 more accurately, reference-value data is obtained a plurality of times and average reference-value data is used as the reference value, contrary to the first embodiment where the sensor 2 is designed to write the reference-value data in the non-volatile memory 22 only once. In other respects, the data collection system of this embodiment is identical to that of the first embodiment. Therefore, explanations of elements common to both the embodiments will be omitted.

Next, major part of the data collection system of this embodiment will be described. The non-volatile memory 22 of the sensor 2 is provided with a plurality of, for example, three reference-value data areas and one data-writing frequency area. Each reference-value data area is stored with reference-value data M1 of, for example, 8 bits, whereas the data-writing frequency area is stored with data (corresponding to the history data M2 in FIG. 5) of, for example, 2 bits indicating the number of times the data-writing has been performed. The determination means 26 of the memory control section 25 serves to control writing the reference-value data by referring to the writing-frequency data stored in the non-volatile memory 22, and control transmitting the output data of the sensing circuit and the reference-value data.

Specifically, when determining based on the writing-frequency data stored in the non-volatile memory 22 that the reference-value data has been written less than the preset number of times, the determination means 26 allows the output data of the sensing circuit 24 of the sensor 2 placed in a predetermined environment to be written as reference-value data, while maintaining the transmitter section 27 inoperative. After the reference-value data has been written the preset number of times, on the other hand, the determination means 26 prohibits further writing and renders the transmitter section 27 operative. As a result, pieces of reference-value data are transmitted from the transmitter section 27 to the readout device 1, together with the output data of the sensing circuit of the sensor placed in a measurement environment, and a reference value is determined by averaging the pieces of reference-value data. By acquiring the reference-value data the required number of times and averaging the pieces of reference-value data in this manner, it is possible to remove the influence of a variation in the output of the sensing device 24 during the reference-value data acquisition, whereby the appropriate reference value can be set.

In the meantime, the reference-value data may be written a plurality of times in succession, while the internal electric power is being generated. Alternatively, it may be written only once during the time the internal electric power is generated continuously.

Figure 7:
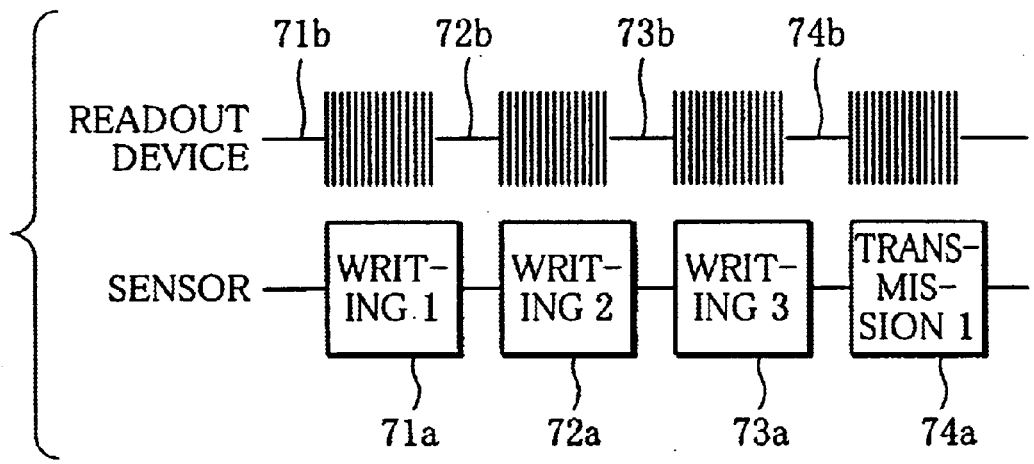
FIG. 7 is a diagram showing changes in operating states, with elapse of time, of a readout device and a sensor in a data collection system according to a second embodiment of the present invention.

In the second embodiment, as shown in FIG. 7, the readout device 1 is configured to periodically radiate the electromagnetic energy and the determination means 26 of the sensor 2 is set with "3" as the number of times writing should be made. The sensor 2 is rendered inoperative when the electromagnetic energy disappears, and starts the next writing operation when receiving the electromagnetic energy again and supplied with the internal electric power. Specifically, at the beginning of periods 71a, 72a and 73a for which the readout device 1 keeps radiating the electromagnetic energy, the internal electric power starts being supplied in the sensor 2 and hence the memory control section 25 is rendered operative. The determination means 26 of the memory control section 25 determines how many times writing has been made up to the present. If writing has been performed less than the preset number of times, the determination means 26 writes the output of the sensing circuit 24 once while receiving the electromagnetic energy.

In energy extinction periods 72b, 73b and 74b, the power supply from the power source section 23 stops, so that various sections of the sensor stop operating. At the beginning of the energy generation period 74a, the determination means 26 determines that the preset number of times of writing is reached, and allows the transmitter section 27 to operate. Because the preset number of times is reached, the transmitter section 27 is rendered operative each time it receives the electromagnetic energy. Thus, three pieces of reference-value data and the output data of the sensing circuit are transmitted to the readout device 1.

The aforementioned writing of reference-value data is carried out in a condition that the sensor 2 is placed in a predetermined environment. Then, the sensor 2 stored with the reference-value data is placed in a measurement environment, and in this state the determination means 26 allows the transmitter section 27 to operate when receiving the electromagnetic energy from the readout device 1 for the first time.

This intermittent operation of the radiation means 11 of the readout device 11 enables the sensor 2 to carry out the writing and transmitting operations at appropriate timings. Alternatively, the timings of writing and transmitting operations may be set by the memory control section 25. This applies to a case where the writing is made once.

Next, a data collection system according to a third embodiment of the present invention will be described.

The data collection system of this embodiment is basically the same as that of the first embodiment, but differs in the way of data-writing/transmission control. In first embodiment, such control is performed depending on whether the history data stored in the history data area of the non-volatile memory 22 is identical to the initial value written during the manufacture or at the shipment of the sensor. Contrary to this, in the third embodiment, binary data of 8 bits each of which is set to "1" is written as an initial value into the reference-value data area of the non-volatile memory 22 during the manufacture of the sensor 2, and in the subsequent initialing or measuring operation, the data-writing/transmission control is performed depending on whether or not data stored in the reference-value data area is identical to the initial value.

Figure 8:
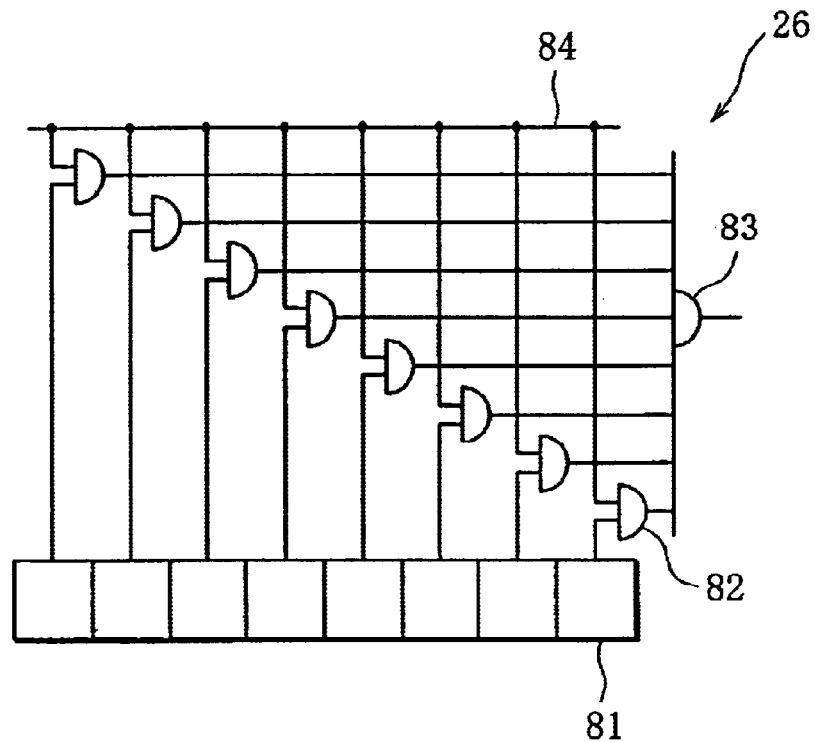
FIG. 8 is a diagram showing an example of a circuit structure of determination mean of a sensor in a data collection system according to a third embodiment of the present invention.

For this purpose, the sensor 2 of this embodiment is provided with the determination means 26 of the memory control section 25 which has, as shown in FIG. 8, a latch 81 of 8 bits for receiving the stored content of the reference-value data area of the non-volatile memory 22 and AND circuits 82 and 83. Eight AND circuits 82 have their input terminals connected individually to eight output terminals of the latch 81, other input terminals thereof connected to a signal line 84, and output terminals thereof connected individually to eight input terminals of the AND circuit 83.

Figure 9:
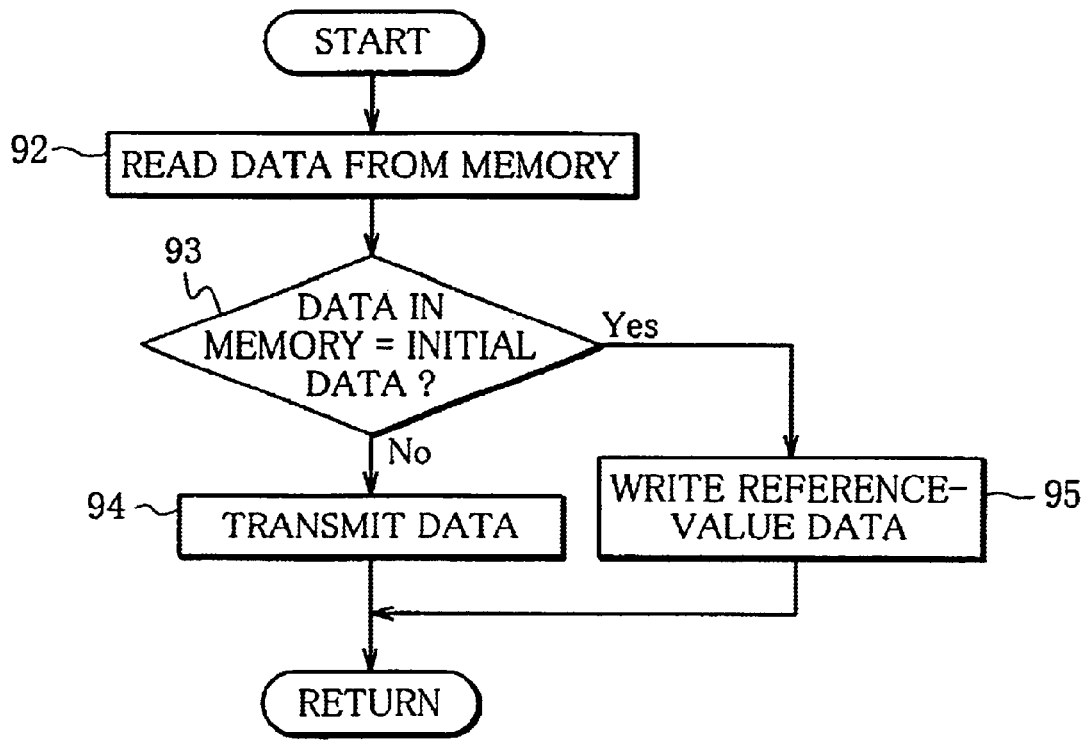
FIG. 9 is a flowchart showing a data-writing/transmission control routine executed by a sensor including the determination means shown in FIG. 8.

When internal electric power is supplied to the memory control section 25 of the sensor 2, the determination means 26 starts executing a data-writing/transmission control routine shown in FIG. 9. First, the determination means 26 reads data from the reference-value data area of the non-volatile memory 22 (step 92), and then enters the read data into the latch 81 and applies a high-level signal "1" to the signal line 84, thereby obtaining a logical product of each bit of the data stored in the reference-value data area of the non-volatile memory 22 and "1". Further, the determination means determines whether the reference-value data stored in the non-volatile memory 22 is identical to the initial value, depending on whether or not the output of the AND circuit 83 is "1" (step 93).

If the result of the determination in step 93 is yes, i.e., the output of the AND circuit 83 is "1", indicating that every bit of the read data is "1" and hence the read data is identical to the initial value, it is determined that reference-value data has not written after manufacture of the sensor. The memory control section 25 writes the output of the sensing circuit 24 into the non-volatile memory 22 as reference-value data (step 95), whereupon the data-writing/transmission control in the present cycle ends. In a control cycle where the reference-value data is written, therefore, the determination means 26 does not allow the transmitter section 27 to operate, thereby preventing a data transmission operation of the transmitter section 27.

If at least one bit of the data read from the non-volatile memory 22 is "0", the output of the AND circuit 83 is "0", so that the result of the determination in step 93 is no. In this case, the control flow proceeds to step 94, determining that reference-value data has already been written, whereby the writing of reference-value data at step 95 is prohibited. In step 94, the memory control section 25 delivers the reference-value data read from the non-volatile memory 22 and the output data of the sensing circuit 24 to the transmitter section 27 from which the data is transmitted to the readout device 1 through the coil.

In the following, a data collection system according to a fourth embodiment of the present invention will be described.

The data collection system of this embodiment is basically identical to that of the first embodiment, but differs in the way of data-writing/transmission control. Specifically, in this embodiment, the writing of reference-value data is not carried out immediately even if it is determined based on the history data M2 that the reference-value data M1 has not been written. Instead, whether or not the output of the sensing circuit 24 is appropriate to be written as reference-value data is determined.

If the output of the sensing circuit 24, which is abnormal, is written into the non-volatile memory 22 as reference value, and such inappropriate reference value is used by the readout device 1 to rectify the output of the sensing circuit in a measurement environment, a serious measurement error is caused. Especially when the counter 45 or the latch 46 of the sensing circuit 24 happens to operate abnormally due to a drop in internal electric power, for instance, a very inappropriate reference value may be set.

Figure 10:
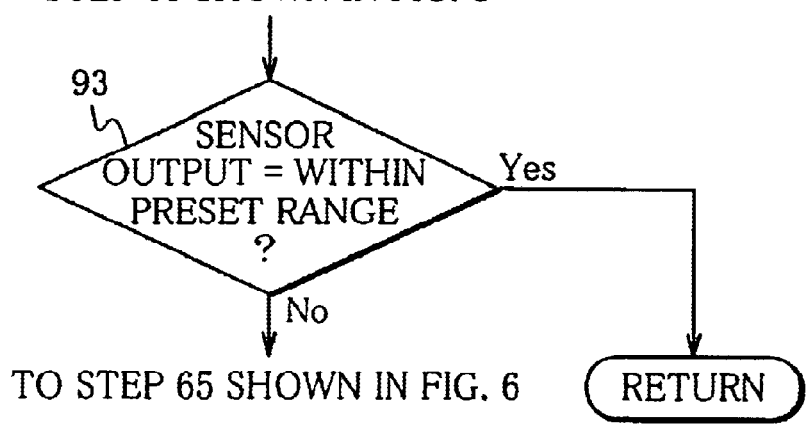
FIG. 10 is a flowchart showing a data-writing/transmission control routine executed by a sensor in a data collection system according to a fourth embodiment of the present invention.

To obviate this, even if the result of the determination in step 63 of the data-writing/transmission control routine shown in FIG. 6 is negative or it is determined that reference-value data M1 has not been written into the non-volatile memory 22, the output data of the sensing circuit 24 is not immediately written into the non-volatile memory 22 as reference-value data. Instead, as shown in FIG. 10, a determination is made as to whether the output data of the sensing circuit 24 is appropriate as reference value (step 102). Specifically, the memory control section 25 determines whether or not the output data of the sensing circuit 24 falls within an allowable range.

As for temperature measurement, even if the sensing circuit entails an individual difference caused in its manufacture, a variation in output value of the counter of the sensing circuit 24 of the sensor 2 ordinarily ranges from 120 to 130 in decimal, when the sensor is placed in a constant temperature bath set at a temperature of 25° C. In that case, the allowable range of the output data of the sensing circuit 24 is set at 120 to 130.

When the result of the determination in step 63 of the control routine shown in FIG. 6 is negative, the memory control section 25 acquires the output data of the sensing circuit 24 and determines whether the output data is within the preset allowable range (step 102). If the output data falls within the allowable range, the output data is written into the non-volatile memory 22 as reference-value data (step 65 in FIG. 6). If the output data of the sensing circuit 24 is out of the allowable range, on the other hand, the execution of the control routine shown in FIG. 6 in the present cycle ends. In the next and subsequent cycles of the control routine, if the result of the determination in step 63 is no, the output data of the sensing circuit 24 is acquired to determine whether the output data is within the allowable range. The timings of acquisition of the output data of the sensing circuit may be in synchronization with the renewal of count value in the latch 46 since the latch 46 holds the count value of the counter 45 of the sensing circuit 24 as mentioned above.

By storing only the output data of the sensing circuit 24 falling within the preset range into the non-volatile memory 22 as reference-value data, inappropriate reference-value data is prevented from being written.

A data collection system according to a fifth embodiment of the present invention will be described.

The data collection system of the present invention, comprising a sensor 2 for storing, as reference-value data, output data of the sensing circuit 24 in a predetermined environment and a readout device 1 for receiving the output data of the sensing circuit and the reference-value data transmitted from the sensor 2 placed in a measurement environment and for rectifying the output data using the reference-value data, may be configured by one or more readout devices and a plurality of sensors placed in different measurement environments.

In this case, individual sensors may be provided with sensing elements having the same measurable range. However, if the measured parameter varies in a different range depending on measurement environment, individual sensors be provided with sensing elements which are different in measurable range. The reference-value data is preferably acquired in a condition that each sensor is placed in a predetermined environment corresponding to a measurement environment into which the sensor will be placed. This means that reference-value data acquisition processes for the individual sensors be performed in different environments.

In the light of the principle that output data of each sensor is rectified by the readout device based on output data and reference-value data transmitted from the sensor, the readout device is not required to recognize the environment in which reference-value data acquisition for the sensor was made. However, a measurement error may be caused for a sensor whose efficiency of receiving electromagnetic energy lowers for some reason, causing an unstable sensor operation of transmitting inappropriate output data and/or reference-value data.

From this point of view, the data collection system of the fifth embodiment is provided with sensors arranged to transmit, in addition to output data and reference-value data, environment data indicating the environment in which reference-value data acquisition was made, so that the readout device may determine suitability of data. In other respects, the system of this embodiment is identical to that of the first embodiment.

Specifically, the data collection system of this embodiment is constituted, by way of example, by one readout device 1 and a plurality of sensors 2 each mounted with a thermosensitive element. Some of these thermosensitive elements are intended for low temperature use and the others are for high temperature use. For reference-value data acquisition for the sensors 2 having thermosensitive elements for low and high temperature use, constant temperature baths preset at low and high temperatures are used, respectively.

Figure 11:
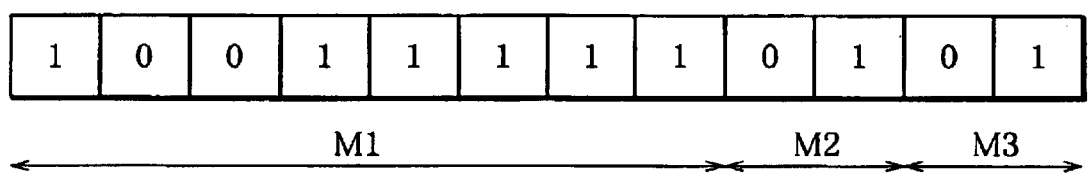
FIG. 11 is a diagram showing an example of structure of data stored in a non-volatile memory of a sensor in a data collection system according to a fifth embodiment of the present invention.
Figure 11:
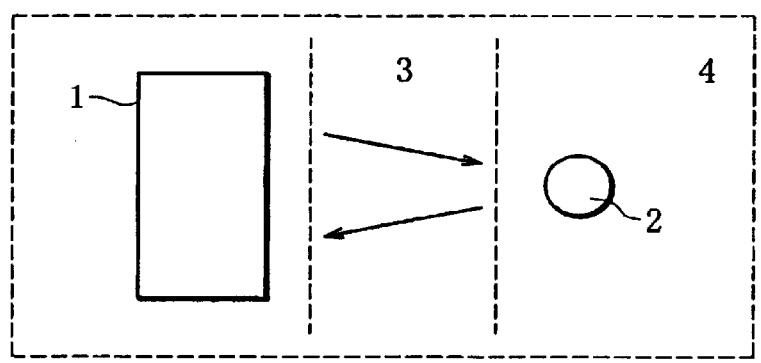

As shown in FIG. 11, the non-volatile memory 22 of each sensor 2 is provided with a reference-value data area for storing reference-value data M1, a history data area for storing history data M2, and an environment data area for storing environment data M3. In the illustrated example, the environment data M3 is represented by binary data of 2 bits. For example, during the manufacture of sensors, the environment data M3 of "01" is written into a sensor intended for low temperature use, whereas the environment data M3 of "10" is written into a sensor for high temperature use.

In the fifth embodiment, data-writing/transmission control (selection of initializing or measuring operation) is effected by the memory control section of each sensor 2 in accordance with the control routine shown in FIG. 6, basically as in the case of the first embodiment.

Specifically, reference-value data M1 is stored in the non-volatile memory 22, with respective sensors 2 placed in a low-or high-temperature constant temperature bath, and then history data M2 is changed from the initial value "00" to "01" (steps 65 and 66 in FIG. 6). When the sensors 2 are placed in measurement environments, respectively, the result of determination in step 63 in FIG. 6 turns into yes. Under the control of the memory control section 25 having determination means 26, the output data of the sensing circuit 24, the reference-value data M1 and the environment data M3 stored in the non-volatile memory 2 are transmitted from the transmitter section 27 to the readout device 1 (step 64 in FIG. 6).

In the readout device 1, the data received from each sensor is analyzed, and whether the sensor is for low or high temperature use is determined based on the environment data M3. The collection means 12 of the readout device 1 is set in advance with allowable ranges of the output data and reference-value data of the sensor for low temperature use and those for high temperature use. The collection means 12 determines in sequence whether the received output data and the received reference-value data are within the relevant allowable ranges corresponding to the result of the determination indicating low or high temperature use. If both the output data and the reference-value data are in their allowable ranges, the collection means rectifies the output data using the reference-value data. If the output data or the received reference-value data is out of the allowable range, the collection means nullifies the output data and the reference-value data.

With the data collection system of this embodiment, a measured value is determined from the output data and the reference-value data received from each sensor only when it is recognized based on the environment data M3 that the output data and the reference-value data are in their allowable ranges. This ensures accurate measurement.

In this embodiment, each sensor 2 is stored at its non-volatile memory 22 with environment data M3 indicating whether the thermosensitive element of the sensor is for low or high temperature use, and, on the basis of the environment data M3, the readout device 1 selectively carries out the measurement based on the received data. However, the environment data M3 can be variously modified depending on the type of sensing element provided in the sensor. It may indicate the kind of a sensing element (for example, indicate whether a pressure-sensitive element is for low or high pressure use). When many kinds of sensing elements are used, environment data represented by binary data of 3 bits or more is used.

In place of or in combination with environment data M3, identification data peculiar to each sensor may be stored in the non-volatile memory of the sensor. Identification data is constituted by binary data of the number of bits required to identify all the sensors. In a case where output data, reference-value data, environment data and identification data are transmitted from each sensor, the readout device 1 can selectively carry out the measurement in accordance with the received data, when determining based on the environment data that the measurement be made, and can determine, on the basis of the identification data, the sensor from which the received data has been transmitted.

In the fifth embodiment, environment data is stored in the non-volatile memory. Alternatively, the sensor may be provided with a hard logic circuit capable of transmitting environment data and/or identification data.

The data collection systems of the first to fifth embodiments are arranged to prohibit the rewriting of reference-value data after output data of a sensor placed in a predetermined environment is once written into a non-volatile memory as reference-value data, and cause a sensor placed in a measurement environment to transmit the output data and the reference-value data. Since the sensor selectively performs the initializing or measuring operation by itself in this manner, the readout device is not required of transmitting electromagnetic energy on which a command to cause individual sensors to start the initialization or the measurement is superimposed. This eliminates the need of providing the sensor 2 with a large-scale electronic circuit for analyzing the command superimposed on electromagnetic energy, whereby the sensor can have a smaller circuit scale. Meanwhile, individual sensors can operate without a problem, even if they receive modulated wave, i.e., electromagnetic energy on which information is superimposed.

In the case of a sensor having a coil (antenna) shown in FIG. 2, the efficiency of receiving electromagnetic energy may lower depending on a positional relationship between the sensor 2 and the radiation means 11 of the readout device 1, so that insufficient internal electric power may be generated. To obviate this, a plurality of radiation means may be provided in such a manner that electromagnetic energy can be given from a plurality of directions, irrespective of in what direction the coil of the sensor is disposed. When electromagnetic energy, on which information such as a command to cause the initializing or measuring operation to be selectively performed is superimposed as is usual, is radiated from a plurality of radiation means, the sensor cannot demodulate the superimposed information from the electromagnetic energy due to interference of electromagnetic energy radiated from the plurality of radiation means. To eliminate such a problem, it is usually necessary for the plurality of radiation means to radiate electromagnetic energy at different timings, making transmission time longer. On the contrary, the present invention using unmodulated electromagnetic energy can eliminate such a problem by using a plurality of radiation means arranged to radiate in-phase electromagnetic energy.

The present invention is not restricted to the first to fifth embodiments, and can be modified variously.

For example, in the embodiments, the sensing circuit constituted by a ring oscillator including a thermosensitive element has been explained. However, it is not inevitably necessary to use a ring oscillator for the sensing circuit, and various sensing circuits having functions of converting a detected temperature into electric signal may be used. As the sensing element, a pressure-sensitive element can be used in place of a thermosensitive element. In that case, the pressure-sensitive element can be integrated on a single semiconductor together with a sensing circuit and other peripheral elements. This applies to other kinds of sensing element and sensing circuit.

What is claimed is:

1. A data collection system comprising a readout device and a sensor, wherein
    said data collection system comprises radiation means for radiating electromagnetic energy,
    said readout device comprises collection means for collecting data from said sensor,
    said sensor comprises a sensing circuit including a sensing element, a coil for introducing the electromagnetic energy radiated from said radiation means, a power source section, connected with said coil, for generating internal electric power, a non-volatile memory, a memory control section for controlling data-writing into said non-volatile memory, and a transmitter section for transmitting an output of said sensing circuit and data stored in said non-volatile memory,
    said memory control section includes determination means for determining the number of times that the data-writing into said non-volatile memory has been made, and said memory control section restricts the number of times of the data-writing into said non-volatile memory to a predetermined number of times and renders said transmitter section operative, on the basis of a result of determination effected by said determination means.

2. The data collection system according to claim 1, wherein said non-volatile memory stores data peculiar to said sensor or data indicating a kind of said sensing circuit.

3. The data collection system according to claim 2, wherein said radiation means is provided in said readout device, and said readout device does not superimpose information on said electromagnetic energy.

4. The data collection system according to claim 3, wherein said memory control section allows an output of said sensing circuit to be written into said non-volatile memory only when the output of said sensing circuit is within a predetermined range.

5. The data collection system according to claim 4, wherein said sensing element in said sensing circuit is comprised of a thermosensitive element or a pressure-sensitive element.

6. The data collection system according to claim 3, wherein said sensing element in said sensing circuit is comprised of a thermosensitive element or a pressure-sensitive element.

7. The data collection system according to claim 2, wherein said memory control section allows an output of said sensing circuit to be written into said non-volatile memory only when the output of said sensing circuit is within a predetermined range.

8. The data collection system according to claim 7, wherein said sensing element in said sensing circuit is comprised of a thermosensitive element or a pressure-sensitive element.

9. The data collection system according to claim 2, wherein said sensing element in said sensing circuit is comprised of a thermosensitive element or a pressure-sensitive element.

10. The data collection system according to claim 1, wherein said radiation means is provided in said readout device, and said readout device does not superimpose information on said electromagnetic energy.

11. The data collection system according to claim 10, wherein said memory control section allows an output of said sensing circuit to be written into said non-volatile memory only when the output of said sensing circuit is within a predetermined range.

12. The data collection system according to claim 11, wherein said sensing element in said sensing circuit is comprised of a thermosensitive element or a pressure-sensitive element.

13. The data collection system according to claim 10, wherein said sensing element in said sensing circuit is comprised of a thermosensitive element or a pressure-sensitive element.

14. The data collection system according to claim 1, wherein said memory control section allows an output of said sensing circuit to be written into said non-volatile memory only when the output of said sensing circuit is within a predetermined range.

15. The data collection system according to claim 14, wherein said sensing element in said sensing circuit is comprised of a thermosensitive element or a pressure-sensitive element.

16. The data collection system according to claim 1, wherein said sensing element in said sensing circuit is comprised of a thermosensitive element or a pressuresensitive element.

* * * * *